United States Patent [19]

Gleasman et al.

[11] Patent Number: 4,776,236
[45] Date of Patent: Oct. 11, 1988

[54] NO-SLIP, IMPOSED DIFFERENTIAL

[76] Inventors: Vernon E. Gleasman, 11 Pondview Dr., Pittsford, N.Y. 14534; Keith E. Gleasman, 11 McCord Woods Dr., Fairport, N.Y. 14450; James Y. Gleasman, 1701 Laguna Loma Cove, Austin, Tex. 78746

[21] Appl. No.: 27,741

[22] Filed: Mar. 19, 1987

Related U.S. Application Data

[63] Continuation-in-part of Ser. No. 818,951, Jan. 15, 1986, abandoned, which is a continuation of Ser. No. 544,390, Oct. 21, 1983, abandoned.

[51] Int. Cl.⁴ .............................................. F16H 37/06
[52] U.S. Cl. ................................... 74/720.5; 74/705; 74/682; 74/675; 180/6.44
[58] Field of Search ....................... 74/720.5, 705, 710, 74/682, 675; 180/6.44

[56] References Cited

U.S. PATENT DOCUMENTS

| | | | |
|---|---|---|---|
| 1,128,818 | 2/1915 | Remy et al. | 74/720.5 X |
| 1,247,725 | 11/1917 | Schneider | 74/720.5 |
| 1,984,831 | 12/1934 | Higley | 74/710 |
| 1,999,071 | 4/1935 | Alden | 74/710 |
| 2,332,838 | 10/1943 | Borgward | 180/6.44 X |
| 2,542,157 | 2/1951 | Odom | 74/710 X |
| 2,730,182 | 1/1956 | Sloane | 180/6.44 |
| 2,763,164 | 9/1956 | Neklutin | 180/6.44 R |
| 2,780,299 | 2/1957 | Matson | 180/6.44 X |
| 2,859,641 | 11/1958 | Gleasman | 74/715 |
| 3,027,780 | 4/1962 | Storer et al. | 74/710 |
| 3,535,954 | 10/1970 | Chambers et al. | 74/720.5 |
| 4,016,754 | 4/1977 | Wiss | 73/862 X |
| 4,274,281 | 6/1981 | Hoodwin | 73/118 |
| 4,489,597 | 12/1984 | Davison | 73/118 |

FOREIGN PATENT DOCUMENTS

| | | | |
|---|---|---|---|
| 1162937 | 9/1958 | France | |
| 323334 | 12/1934 | Italy | 180/6.44 |
| 707655 | 4/1954 | United Kingdom | 180/6.44 |

*Primary Examiner*—Dirk Wright
*Attorney, Agent, or Firm*—Stonebraker, Shepard & Stephens

[57] ABSTRACT

A no-slip, imposed differential uses a first unlimited slip differential 15 connected for driving a pair of axle shafts 16 and 17 and a second unlimited slip differential 20 connected between a pair of control shafts 22 and 23. One of the axle shafts and one of the control shafts are connected for rotation in the same direction, and the other axle shaft and the other control shaft are connected for rotation in opposite directions. An input control gear 40 meshed with a ring gear 21 for second differential 20 can rotate control shafts 22 and 23 to impose differential rotation on axle shafts 16 and 17 via the shaft connecting means. This provides a no-slip drive when control gear 40 is not turning and a steering drive by imposed differential rotation when control gear 40 turns. A clutched power take-off 82 can direct propulsion torque to the steering control input for rapid pivot turns.

14 Claims, 3 Drawing Sheets

NO-SLIP, IMPOSED DIFFERENTIAL

RELATED APPLICATIONS

This application is a continuation-in-part of pending parent application Ser. No. 818,951, filed Jan. 15, 1986, entitled NO-SLIP, IMPOSED DIFFERENTIAL, which parent application is a Continuation of grandparent application Ser. No. 544,390, filed Oct. 21, 1983, entitled NO-SLIP, IMPOSED DIFFERENTIAL, both parent and grandparent applications being abandoned upon the filing of successor applications.

BACKGROUND

This invention arose from a search for a better way of steering track-laying vehicles, although the resulting discoveries also apply to many types of wheeled vehicles. Track-laying vehicles such as tractors are steered by a clutch and brake system that can unclutch the power to one track and brake one track while another track drives. Such arrangements are expensive and troublesome for many reasons, however.

For example, disconnecting power to the left track of a tractor running on level ground tends to make the tractor turn left because the driving right track outdistances the left, but doing the same thing when the tractor is running downhill tends to make it turn right because the engine holds the right track back while the left rolls free. Braking tracks to slow down tends to straighten the line of travel so drivers must guard against braking on curves. Also, the sharpest turn a track-laying vehicle can make is by braking one track while driving the other, and this stresses the braked track considerably.

In searching for a better solution for these and other problems, we have discovered a way of imposing differential rotation on axle shafts for steering both track-laying and wheeled vehicles. Our imposed differential can simultaneously drive wheels or tracks forward on one side of a vehicle and backward on the other side to allow pivot turns around a central point without overly stressing tracks or wheels. Our system can apply main propulsion drive torque to such pivot turns to accomplish them rapidly, if necessary. Our discovery also provides a no-slip differential that drives both sides of a vehicle regardless of relative traction and applies more power to the side with the greater traction.

Our invention also leads to an improvement in wheel dynamometers for testing drive axles. It allows differential rotation to be imposed realistically on axle shafts under load. Our invention also accomplishes these advances by combining inexpensive and well-known components in ways that produce improved results.

SUMMARY OF THE INVENTION

Our no-slip, imposed differential applies to a drive system having a main propulsion engine providing drive torque via a drive differential to a pair of opposed axle shafts and having a separate steering control differential differentiating steering control torque to a pair of control shafts respectively connected additively and subtractively with the axle shafts. Our system uses a steering control motor that is rotationally independent of the main propulsion engine and the driving torque, and the steering control motor provides steering control torque to a casing of the steering control differential so that the control shafts turn in response to rotation of the casing. A worm gear is turned by the steering control motor and is meshed with a reducing worm wheel, preferably forming a ring gear for the casing of the steering control differential. This allows the worm gear to turn the casing and the control shafts for steering the vehicle, but does not allow the control shafts or the casing to turn the worm gear. For pivot turns power assisted by main propulsion torque, a power take-off from the drive torque is clutched into the steering control drive train to turn the worm wheel for rotating the casing and the control shafts.

DRAWINGS

DETAILED DESCRIPTION

Figure 1:
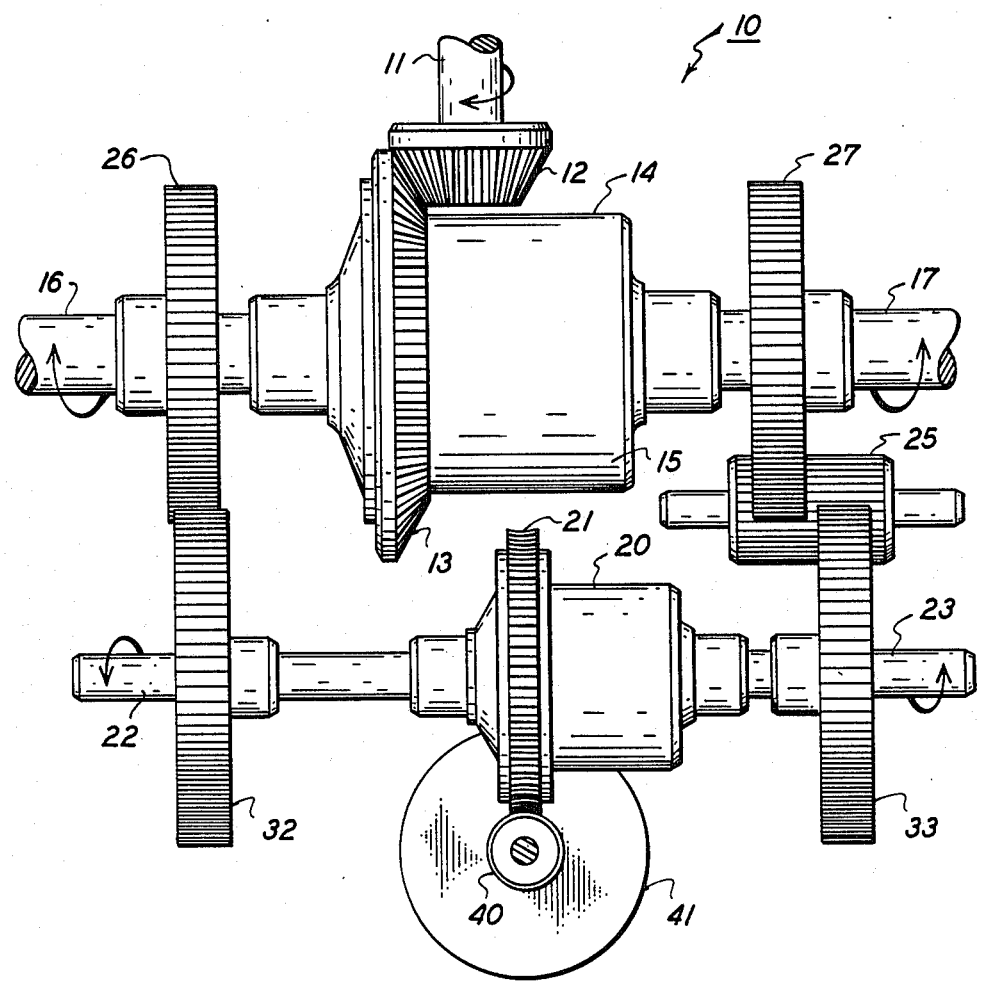
FIG. 1 is a partially schematic view of a preferred embodiment of a no-slip, imposed differential according to our invention.
Figure 2:
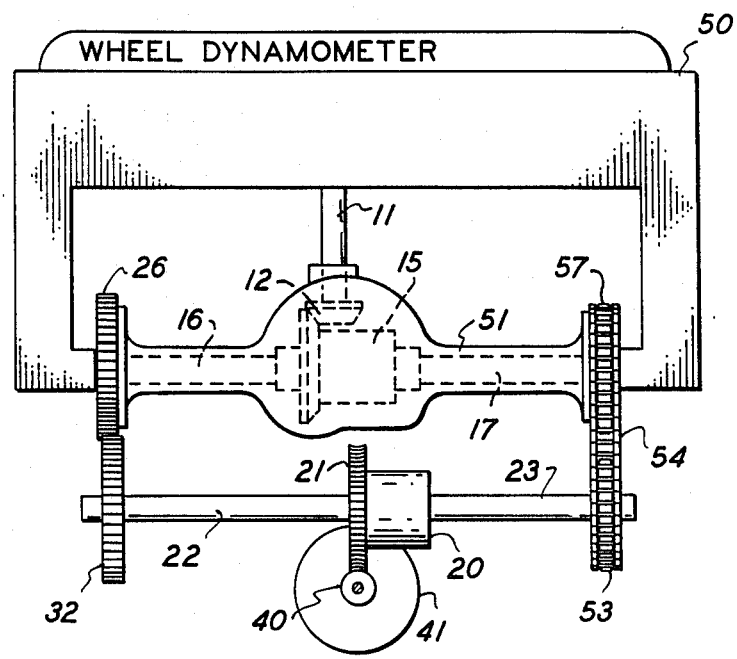
FIG. 2 is a partially schematic view of our imposed differential applied to a wheel dynamometer.

An explanation of the operation and advantages of our invention follows a description of the basic preferred structure or configuration of our no-slip, imposed differential as best shown in FIGS. 1 and 2.

STRUCTURE

As applied to a vehicle as shown in FIG. 1, engine power input via shaft 11 turning gear 12 rotates ring gear 13 and case 14 of a conventional, unlimited slip differential 15 connected for driving a pair of axle shafts 16 and 17 on opposite sides of the vehicle. Differential 15 is generally known and well understood in the power transmission art and is suitably sized to the vehicle being driven. This can range from small garden tractors and tillers up to large tractors and earth movers. Differential 15 is preferably a bevel gear differential lacking any limited slip devices so as not to impair differential rotation of axle shafts 16 and 17.

A second differential 20, also of a conventional unlimited slip design, is connected between a pair of control shafts 22 and 23 that are interconnected in a driving relationship with axle shafts 16 and 17. One control shaft 23 and one axle shaft 17 are connected for rotation in the same direction, and another control shaft 22 and another axle shaft 16 are connected for rotation in opposite directions. This causes counter or differential rotation of control shafts 22 and 23 as axle shafts 16 and 17 rotate in the same direction and conversely causes differential rotation of axle shafts 16 and 17 as control shafts 22 and 23 rotate in the same direction.

Gear connections between control shafts and axle shafts as shown in FIG. 1 are preferred for larger and more powerful vehicles. These include axle shaft gears 26 and 27 fixed respectively to axle shafts 16 and 17 and control shaft gears 32 and 33 fixed respectively to control shafts 22 and 23. Meshing axle shaft gear 26 with control shaft gear 32 provides opposite rotation between axle shaft 16 and control shaft 22, and meshing both axle shaft gear 27 and control shaft gear 33 with idler gear 25 provides same direction rotation for axle shaft 17 and control shaft 23.

Gear connections between control shafts and axle shafts are preferably incorporated into an enlarged housing containing both axle differential 15 and control differential 20. For a reason explained below, control differential 20 can be sized to bear half the force borne by axle differential 15 so that the complete assembly can be fitted within a differential housing that is not unduly large.

Smaller or less powerful vehicles can use shaft interconnections such as belts or chains in place of gearing. Also, shaft interconnections need not be limited to the region of the axle differential and can be made toward the outer ends of the axle shafts.

A gear or drive ratio between control shafts and axle shafts is preferably 1:1. This ratio can vary, however, so long as it is the same on opposite sides of the axle and control differentials.

An input control gear 40 meshes with a ring gear 21 of control differential 20 for imposing differential rotation on the system. Gear 40 is preferably a worm gear, and ring gear 21 is preferably a worm wheel so that ring gear 21 turns only when gear 40 turns.

Gear 40 can be turned by several mechanisms, depending on the objective. For steering purposes, gear 40 can be turned by a steering shaft joined to control gear 40 and manually turned by a driver. Steering mechanisms can also use motors for turning gear 40. Alternatives include a DC starter motor 41 electrically turned via a rheostat in a steering system and a hydraulic or pneumatic motor turned by a vehicle's hydraulic or pneumatic system in response to a steering control.

Our invention can also be applied to a wheel dynamometer 50 as schematically shown in FIG. 2. For such purpose, the drive axle 51 being tested by the dynamometer provides axle shafts 16 and 17 and axle differential 15, which need not be an unlimited slip differential and can be a no-slip differential such as disclosed in U.S. Pat. No. 2,859,641. Power applied via input shaft 11 turns axle shafts 16 and 17, which can be subjected to varying loads by wheel dynamometer 50.

Previous wheel dynamometers have caused differential rotation of axle shafts 16 and 17 by subjecting them to different loads. This will not work with the differential of U.S. Pat. No. 2,859,641, which applies more power to the more heavily loaded axle shaft.

Our invention can apply differential rotation directly and realistically to axle shafts 16 and 17 via control differential 20 and its control shafts 22 and 23. These are connected to axle shafts 16 and 17 for same and opposite direction rotation as explained above; and when turned by control gear 40 rotated by motor 41, control shafts 22 and 23 impose differential rotation on axle shafts 16 and 17.

Several drive interconnections are possible between the control shafts and the axle shafts of the test axle mounted on wheel dynamometer 50. One preferred arrangement shown in FIG. 2 uses meshed gears 26 and 32 fixed respectively to test axle shaft 16 and control shaft 22 for opposite direction rotation. Sprockets 57 and 53, coupled by a chain 54 and fixed respectively to test axle shaft 57 and control shaft 23, provide same direction rotation. Belts and other gearing arrangements are also possible.

OPERATION

Two important effects occur from the interconnection of control differential 20 and its control shafts 22 and 23 with axle differential 15 and axle shafts 16 and 17. One is a no-slip drive that prevents wheels or tracks from slipping unless slippage occurs on both sides of the vehicle at once. The other effect is imposed differential rotation that can accomplish steering to pivot or turn a vehicle.

The no-slip drive occurs because axle shafts 16 and 17 are geared together via differential 20. Power applied to an axle shaft on a side of the vehicle that has lost traction is transmitted to the connecting control shaft on that side, through differential 20 to the opposite control shaft, and back to the opposite axle shaft where it is added to the side having traction. So if one axle shaft loses traction, the opposite axle shaft drives harder; and the only way slippage can occur is if both axle shafts lose traction simultaneously.

To elaborate on this, consider a vehicle rolling straight ahead with its axle shafts 16 and 17 turning uniformly in the same direction. Control gear 40 is stationary for straight ahead motion; and since control gear 40 is preferably a worm gear, a worm wheel 21 of control differential 20 cannot turn. Control shafts 22 and 23, by their driving connections with the axle shafts, rotate differentially in opposite directions, which control differential 20 accommodates.

Axle differential 15 equally divides the power input from shaft 11 and applies one-half of the input power to each axle shaft 16 and 17. If the track or wheel being driven by axle shaft 16 loses traction, it cannot apply the power available on shaft 16 and tends to slip. Actual slippage cannot occur, however, because axle shaft 16 is geared to control shaft 22. So if a wheel or track without traction cannot apply the power on shaft 16, this is transmitted to control shaft 22, which rotates in an opposite direction from axle shaft 16. Since ring gear 21 cannot turn, rotational power on control shaft 22 is transmitted through differential 20 to produce opposite rotation of control shaft 23. This is geared to axle shaft 17 via idler gear 25 so that power on control shaft 23 is applied to axle shaft 17 to urge shaft 17 in a forward direction driving the wheel or track that has traction and can accept the available power. Since only one-half of the full available power can be transmitted from one axle shaft to another via differential 20 and its control shafts, these can be sized to bear one-half the force borne by axle differential 15 and its axle shafts.

Of course, unusable power available on axle shaft 17 because of a loss of traction on that side of the vehicle is transmitted through the same control shaft and control differential route to opposite axle shaft 16. This arrangement applies the most power to the wheel or track having the best traction, which is ideal for advancing the vehicle. The wheel or track that has lost traction will maintain rolling engagement with the ground while the other wheel or track drives. The only time wheels or tracks can slip is when they both lose traction simultaneously.

To impose differential rotation on axle shafts 16 and 17 for pivoting or turning the vehicle, it is only necessary to rotate control gear 40. This differentially rotates axle shafts to turn or pivot the vehicle because of the different distances traveled by the differentially rotating wheels or tracks on opposite sides of the vehicle. Steering controlled by rotating gear 40 can be applied to track-laying vehicles and wheeled vehicles that steer without using turning wheels. It can also be used for differentially rotating drive wheels or tracks to provide power-assisted steering for a vehicle that also has turning wheels.

Whenever control gear 40 turns, it rotates ring gear 21, which turns the casing of differential 20 to rotate control shafts 22 and 23 in the same direction. The connection of control shafts 22 and 23 with axle shafts 16 and 17 converts the same direction rotation of control shafts 22 and 23 to opposite differential rotation of axle shafts 16 and 17, as accommodated by axle differential 15. This drives wheels or tracks forward on one side of the vehicle and rearward on the other side of the vehicle, depending on the direction of rotation of control gear 40.

Such differential rotation is added to whatever forward or rearward rotation of the axle shafts is occurring at the time. So if a vehicle is moving forward or backwrd when control gear 40 turns, the differential rotation advances and retards opposite axle shafts and makes the vehicle turn.

Figure 3:
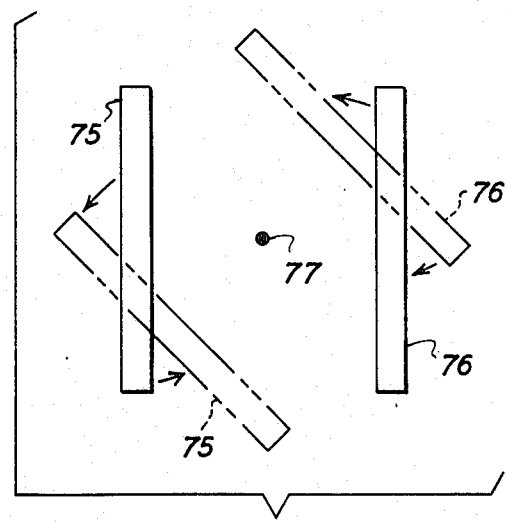
FIG. 3 is a schematic view of a vehicle pivot turn made possible by our imposed differential.

If a vehicle is not otherwise moving when control gear 40 turns, wheels or tracks go forward on one side and backward on the other side so that the vehicle pivots on a central point. This is schematically illustrated in FIG. 3 for a vehicle having a pair of tracks 75 and 76. Both tracks can have a rolling engagement with the ground as the vehicle rotates around a center point 77 by driving right track 76 forward and left track 75 rearward. The tracks experience some heel and toe scuffing, but this is less stress than if one track were braked still and the other driven. The pivot turn also spins the vehicle on one point 77, without requiring motion in any direction as must occur when one track is braked and another is driven.

Pivot turns can also be made with wheeled vehicles, such as tractors, loaders, forklifts, etc. Many of these now have turning wheels that could advantageously be replaced by non-turning wheels steered by imposed differential rotation according to our invention. To accommodate such vehicles, our invention can be applied to more than one drive axle powering more than one pair of drive wheels. Evidence indicates that pivot-turning capability can save considerable time for loaders, tractors, and forklifts compared to turning patterns requiring forward and rearward motion.

Figure 4:
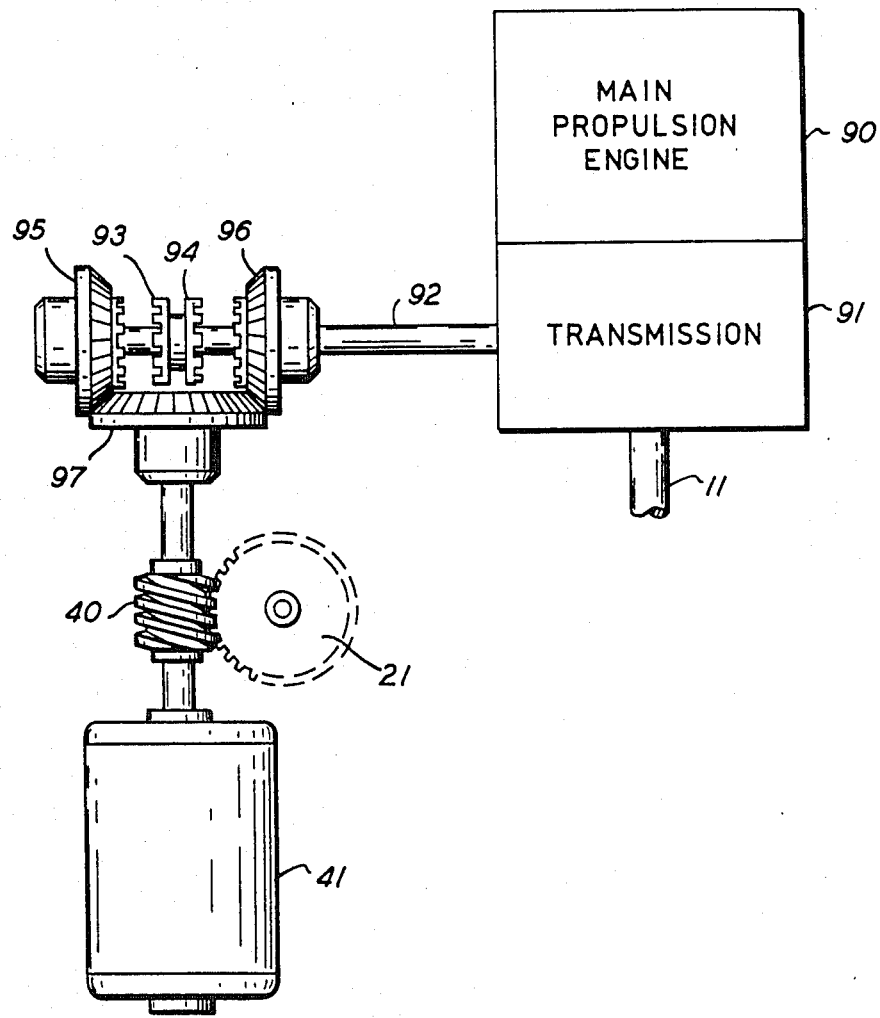
FIG. 4 is a schematic view of a clutch system for a power take-off applying drive torque to the steering control input for powering pivot turns.

Pivot turns can also be power assisted or powered totally by driving torque to be executed more rapidly. Since a vehicle is not using driving torque for forward or rearward movement when pivot turning occurs, driving torque is available for powering pivot turns; and FIG. 4 schematically shows a preferred way of accomplishing this.

A power take-off 92 from a transmission 91 or main propulsion engine 90 rotates clutch parts 93 and 94. Either of these can be engaged with its counterpart 95 and 96, each of which are meshed with bevel gear 97 rotating with worm gear 40. To apply driving torque to a pivot turn in one direction, clutch part 93 is meshed with clutch part 95 to turn bevel gear 97 in the desired direction for rotating worm gear 40 and worm wheel 21. Steering control motor 41 can be unclutched for engine powered pivot turns or can combine its torque with the torque provided via bevel gear 97. For applying propulsion torque to power a pivot turn in an opposite direction, clutch part 94 meshes with its counterpart 96, driving bevel gear 97 in an opposite direction and turning worm 40 and worm wheel 21 in an opposite direction.

A power take-off can be derived from many points along the main propulsion drive train, including engine 90, transmission 91, and other points. A power take-off can be made to turn continuously or be operated only when needed for pivot turns. The engagement of clutch parts 93 and 94 can be made responsive to full turn of a steering wheel, calling for a pivot turn; and any engagement of clutch parts 93 and 94 can be locked out during forward or rearward movement of the vehicle, if desired. Propulsion assisted pivot turning can also be applied to worm wheel 21 by a worm gear separate from steering control input worm gear 40, and different clutch arrangements can be used for engaging and disengaging the diversion of drive torque for pivot turning. Applying drive torque to the steering control input allows pivot turns to be accomplished more rapidly than would be possible with a small sized steering control motor 41, adequate for forward and rearward steering.

We claim:

1. In a no-slip steer drive system having a drive differential dividing driving torque between drive axles and having a steering differential dividing steering control torque between a pair of control shafts respectively connected additively and subtractively with said drive axles, the improvement comprising:
   a. a steering control motor that is rotationally independent of said driving torque for providing said steering control torque to a worm gear turned by said steering control motor and meshed with a reducing worm wheel forming a ring gear for a casing of said steering differential so that said steering control torque, continuously input to said steering differential, turns said casing to turn said control shafts but cannot be turned by said casing;
   b. said steering control motor being rotatable when said drive differential is not turning said drive axles so that said steering control torque can counterrotate said drive axles for pivot turning without moving forward or backward; and
   c. said drive axles extending from said drive differential to a region of said additive and subtractive connection of said control shafts to said drive axles so that drive torque from a tendency of one of said drive axles to slip is transmitted via said control shafts and said steering control differential to an opposite one of said drive axles not tending to slip.

2. The improvement of claim 1 including a clutched system for accomplishing said pivot turning by diverting said driving torque from said drive differential to said worm wheel to apply said driving torque to said worm wheel without turning said drive differential.

3. The improvement of claim 2 wherein said clutched system includes a power take-off for transmitting said driving torque to said worm wheel.

4. A method of no-slip steer driving a vehicle having a main propulsion engine providing driving torque differentiated between drive axles and having a steering control differential differentiating steering control torque between control shafts connected additively and subtractively with said drive axles, said method comprising:
   a. using a steering control motor that is rotationally independent of said main propulsion engine for providing said steering control torque, and applying said steering control torque to turn a worm gear meshed with a reducing worm wheel turning a casing of said steering control differential so that said casing cannot rotate said worm gear and said casing rotates only when said steering control torque rotates said worm gear;
   b. stopping said steering control motor and using said steering control motor as a torque-resisting load holding said worm gear against rotation during straight-ahead movement, and driving said steering control motor when said main propulsion engine is not providing driving torque to said drive axles for pivot turning by counterrotating said drive axles without moving forward or backward; and c. transmitting drive torque from one of said drive axles tending to slip via said control shafts and said steering control differential to an opposite one of said drive axles not tending to slip.

5. The method of claim 4 including applying said driving torque to said worm wheel for said pivot turning.

6. The method of claim 5 including using a clutched power take-off for transmitting said driving torque from said main propulsion engine to said worm wheel.

7. A no-slip steer drive system having a main propulsion engine providing driving torque via a drive differential to a pair of opposed axle shafts and having a separate steering control differential differentiating steering control torque to a pair of control shafts respectively connected additively and subtractively with said axle shafts, said system comprising:

a. a steering control motor that is rotationally independent of said main propulsion engine, said steering control motor providing said steering control torque to a casing of said steering control differential so that said control shafts are turned in response to rotation of said casing;

b. a worm gear turned by said steering control motor;

c. a reducing worm wheel meshed with said worm gear and turning with said casing of said steering control differential so that said casing turns said control shafts and cannot turn said worm gear;

d. said axle shafts extending from said drive differential to a region of said additive and subtractive connection of said control shafts with said axle shafts so that drive torque from a tendency of one of said drive axles to slip is transmitted via said control shafts and said steering control differential to an opposite one of said drive axles not tending to slip; and e. said steering control motor being arranged for holding said worm gear against rotation during straight-ahead movement and for rotating said worm gear, without any of said driving torque being applied to said drive differential, for counterrotating said axle shafts for pivot turning without forward or backward movement.

8. The system of claim 7 including a power take-off directing said driving torque from said main propulsion engine to said worm wheel for propulsion drive assistance for said pivot turning.

9. The system of claim 8 including a clutch for selectively engaging said driving torque with said worm wheel.

10. The system of claim 7 wherein said worm wheel is a ring gear for said casing of said steering control differential.

11. A no-slip steer drive system for a vehicle having a main propulsion engine providing driving torque to a drive differential connected between drive axles on opposite sides of said vehicle and having a steering control differential connected between a pair of control shafts respectively connected additively and subtractively with said axle shafts, said system comprising:

a. a steering control motor that is rotationally independent of said main propulsion engine for inputting said steering control torque to a casing of said steering control differential for turning said control shafts;

b. said steering control differential having a ring gear formed as a worm wheel;

c. a worm gear driven by said steering control motor being meshed with said worm wheel;

d. said worm gear and said worm wheel forming a reduction drive so that said worm gear can turn said casing of said steering control differential, but said casing cannot turn said worm gear;

e. said steering control motor being arranged for holding said worm gear against rotation during straight-ahead movement of said vehicle and for rotating said worm gear or counter-rotating said drive axles to pivot turn said vehicle when said main propulsion engine is not providing driving torque to said drive differential for moving said vehicle forward or backward; and f. said drive axles extending from said drive differential to a region of said additive and subtractive connection with said control shafts so that drive torque from a tendency of one of said drive axles to slip is transmitted through said control shafts and said steering control differential to an opposite one of said drive axles not tending to slip.

12. The system of claim 11 including a clutch system for directing said driving torque to said worm wheel for using said driving torque for powering pivot turns.

13. The system of claim 12 wherein said clutch system disengages said driving torque from said drive differential during said pivot turns.

14. The system of claim 13 wherein said clutch system engages and disengages a power take-off from said driving torque.

* * * * *